(12) United States Patent
Hussain

(10) Patent No.: US 7,861,061 B2
(45) Date of Patent: Dec. 28, 2010

(54) PROCESSOR INSTRUCTION INCLUDING OPTION BITS ENCODING WHICH INSTRUCTIONS OF AN INSTRUCTION PACKET TO EXECUTE

(75) Inventor: Zahid Hussain, Berkshire (GB)

(73) Assignee: STMicroelectronics (R&D) Ltd., Buckinghamshire (GN)

( * ) Notice: Subject to any disclaimer, the term of this patent is extended or adjusted under 35 U.S.C. 154(b) by 278 days.

(21) Appl. No.: 10/444,932

(22) Filed: May 23, 2003

(65) Prior Publication Data

US 2004/0073776 A1 Apr. 15, 2004

(30) Foreign Application Priority Data

May 31, 2002 (EP) .................................. 02253869

(51) Int. Cl.
*G06F 15/00* (2006.01)
*G06F 15/76* (2006.01)
*G06F 9/30* (2006.01)
*G06F 9/40* (2006.01)

(52) U.S. Cl. ........................................ 712/24; 712/215
(58) Field of Classification Search ................... 712/24, 712/215
See application file for complete search history.

(56) References Cited

U.S. PATENT DOCUMENTS

| | | | | |
|---|---|---|---|---|
| 4,833,599 A | * | 5/1989 | Colwell et al. | 712/236 |
| 5,057,837 A | * | 10/1991 | Colwell et al. | 341/55 |
| 5,179,680 A | * | 1/1993 | Colwell et al. | 711/125 |
| 5,337,415 A | | 8/1994 | DeLano et al. | |
| 5,560,028 A | * | 9/1996 | Sachs et al. | 712/23 |
| 5,758,114 A | * | 5/1998 | Johnson et al. | 712/204 |
| 5,970,241 A | * | 10/1999 | Deao et al. | 712/227 |
| 6,081,884 A | * | 6/2000 | Miller | 712/204 |
| 6,154,828 A | * | 11/2000 | Macri et al. | 712/24 |
| 6,286,094 B1 | | 9/2001 | Derrick et al. | |
| 6,415,376 B1 | * | 7/2002 | Mohamed et al. | 712/24 |
| 6,684,320 B2 | * | 1/2004 | Mohamed et al. | 712/24 |
| 6,892,293 B2 | * | 5/2005 | Sachs et al. | 712/215 |

FOREIGN PATENT DOCUMENTS

| | | | |
|---|---|---|---|
| EP | 855648 A2 | * | 7/1998 |
| WO | WO 99/19793 A1 | | 4/1999 |

OTHER PUBLICATIONS

European Search Report from European Patent Application 02253869.8, filed May 31, 2002.

* cited by examiner

*Primary Examiner*—Eddie P Chan
*Assistant Examiner*—George D Giroux
(74) *Attorney, Agent, or Firm*—Lisa K. Jorgenson; James H. Morris; Wolf, Greenfield & Sacks, P.C.

(57) ABSTRACT

A processor and a method for executing VLIW instructions by first fetching a VLIW instruction and then identifying from option bits encoded in a first one of the instructions within the fetched VLIW instruction packet which, if any, of the remaining instructions within the VLIW instruction are to be executed in the same execution cycle as the first instruction. Finally, executing the first instruction and any remaining instructions identified from the encoded option bits.

16 Claims, 8 Drawing Sheets

| | TYPE | 0 1 2 3 | 4 | 5 6 7 8 9 10 | 11 12 13 14 15 16 17 18 19 | 20 21 22 23 24 25 | 26 27 28 29 30 31 |
|---|---|---|---|---|---|---|---|
| 20 | 1 | pred | 0 | opcode | option | Src2 | Src1 | Dst |
| 22 | 2 | pred | 1 | opcode | res | Immediate | Src1 | Dst |
| 24 | 3 | pred | 0 | opcode | Immediate | Src1 | Dst |
| 26 | 4 | pred | 10 | opcode | Immediate | Dst |
| 28 | 5 | pred | 11 | opcode | Immediate |

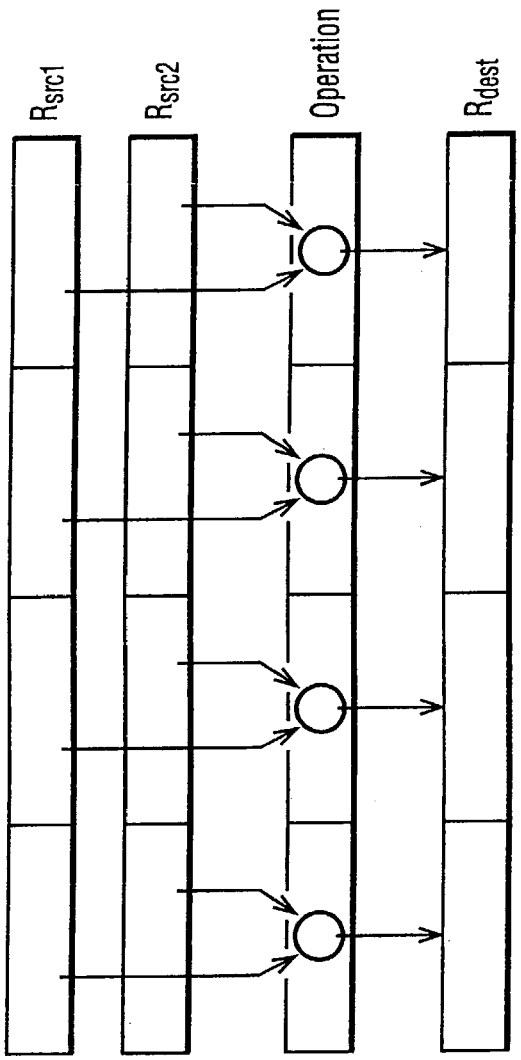

FIG. 9

| | | IF1 | IF2 | IF3 | ID | DE1 | DE2 | EX | WB | | | | | | |
|---|---|---|---|---|---|---|---|---|---|---|---|---|---|---|---|
| | INSTRUCTION 1 | IF1 | IF2 | IF3 | ID | DE1 | DE2 | EX | WB | | | | | | |
| | INSTRUCTION 2 | IF1 | IF2 | IF3 | ID | DE1 | DE2 | EX | WB | | | | | | |
| VLIW1 | INSTRUCTION 3 | IF1 | IF2 | IF3 | ID | DE1 | DE2 | EX | WB | | | | | | |
| | INSTRUCTION 4 | IF1 | IF2 | IF3 | ID | DE1 | DE2 | EX | WB | | | | | | |
| | INSTRUCTION 5 | IF1 | IF2 | IF3 | ID | DE1 | DE2 | EX | WB | | | | | | |
| | INSTRUCTION 6 | | IF1 | IF2 | IF3 | ID | DE1 | DE2 | EX | WB | | | | | |
| | INSTRUCTION 7 | | IF1 | IF2 | IF3 | ID | DE1 | DE2 | EX | WB | | | | | |
| VLIW2 | INSTRUCTION 8 | | IF1 | IF2 | IF3 | ID | DE1 | DE2 | EX | WB | | | | | |
| | INSTRUCTION 9 | | IF1 | IF2 | IF3 | ID | DE1 | DE2 | EX | WB | | | | | |
| | INSTRUCTION 10 | | IF1 | IF2 | IF3 | ID | DE1 | DE2 | EX | WB | | | | | |
| | INSTRUCTION 11 | | | IF1 | IF2 | IF3 | ID | DE1 | DE2 | EX | WB | | | | |
| | INSTRUCTION 12 | | | IF1 | IF2 | IF3 | ID | DE1 | DE2 | EX | WB | | | | |
| VLIW3 | INSTRUCTION 13 | | | IF1 | IF2 | IF3 | ID | DE1 | DE2 | EX | WB | | | | |
| | INSTRUCTION 14 | | | IF1 | IF2 | IF3 | ID | DE1 | DE2 | EX | WB | | | | |
| | INSTRUCTION 15 | | | IF1 | IF2 | IF3 | ID | DE1 | DE2 | EX | WB | | | | |
| | • | | | | IF1 | IF2 | IF3 | ID | DE1 | DE2 | EX | WB | | | |
| | • | | | | IF1 | IF2 | IF3 | ID | DE1 | DE2 | EX | WB | | | |
| | • | | | | IF1 | IF2 | IF3 | ID | DE1 | DE2 | EX | WB | | | |
| | • | | | | IF1 | IF2 | IF3 | ID | DE1 | DE2 | EX | WB | | | |
| | • | | | | IF1 | IF2 | IF3 | ID | DE1 | DE2 | EX | WB | | | |
| | • | | | | | IF1 | IF2 | IF3 | ID | DE1 | DE2 | EX | WB | | |
| | • | | | | | IF1 | IF2 | IF3 | ID | DE1 | DE2 | EX | WB | | |
| | • | | | | | IF1 | IF2 | IF3 | ID | DE1 | DE2 | EX | WB | | |
| | • | | | | | IF1 | IF2 | IF3 | ID | DE1 | DE2 | EX | WB | | |
| | • | | | | | IF1 | IF2 | IF3 | ID | DE1 | DE2 | EX | WB | | |
| | • | | | | | | IF1 | IF2 | IF3 | ID | DE1 | DE2 | EX | WB | |
| | • | | | | | | IF1 | IF2 | IF3 | ID | DE1 | DE2 | EX | WB | |
| | • | | | | | | IF1 | IF2 | IF3 | ID | DE1 | DE2 | EX | WB | |
| | • | | | | | | IF1 | IF2 | IF3 | ID | DE1 | DE2 | EX | WB | |
| | • | | | | | | IF1 | IF2 | IF3 | ID | DE1 | DE2 | EX | WB | |
| | • | | | | | | | IF1 | IF2 | IF3 | ID | DE1 | DE2 | EX | WB |
| | • | | | | | | | IF1 | IF2 | IF3 | ID | DE1 | DE2 | EX | WB |
| | • | | | | | | | IF1 | IF2 | IF3 | ID | DE1 | DE2 | EX | WB |
| | • | | | | | | | IF1 | IF2 | IF3 | ID | DE1 | DE2 | EX | WB |
| | • | | | | | | | IF1 | IF2 | IF3 | ID | DE1 | DE2 | EX | WB |
| | INSTRUCTION 36 | | | | | | | | IF1 | IF2 | IF3 | ID | DE1 | DE2 | EX | WB |
| | INSTRUCTION 37 | | | | | | | | IF1 | IF2 | IF3 | ID | DE1 | DE2 | EX | WB |
| VLIW8 | INSTRUCTION 38 | | | | | | | | IF1 | IF2 | IF3 | ID | DE1 | DE2 | EX | WB |
| | INSTRUCTION 39 | | | | | | | | IF1 | IF2 | IF3 | ID | DE1 | DE2 | EX | WB |
| | INSTRUCTION 40 | | | | | | | | IF1 | IF2 | IF3 | ID | DE1 | DE2 | EX | WB |

PROCESSOR INSTRUCTION INCLUDING OPTION BITS ENCODING WHICH INSTRUCTIONS OF AN INSTRUCTION PACKET TO EXECUTE

BACKGROUND OF THE INVENTION

1. Field of the Invention

This invention relates to instruction encoding and a processor architecture for executing such instructions. The present invention is concerned particularly, but not exclusively, with a processor capable of supporting 3D (three-dimensional) images where the generation of such images is dominated by floating point and multiplication operations.

2. Discussion of the Related Art

Modern multimedia applications place substantial requirements on computing resources. The video gaming industry is of significant commercial value to manufacturers who are constantly striving to develop powerful computing platforms, which provide users with a more exciting interactive experience. The graphics of a video game may be enhanced by creating images that are more life-like. In order for images to be more life-like, a video game may require three-dimensional (3D) images and/or the real-time generation of such images. To satisfy these requirements, graphic processors need to perform more operations in a shorter space of time resulting in the need for machines with increased "number-crunching" ability.

One technique for increasing processor performance is using a VLIW (Very Long Instruction Word) format and a processor architecture capable of executing such instructions. VLIW engines are well known, where a fetched VLIW instruction comprises a plurality of operations to be executed simultaneously by different functional units of the VLIW processor.

Although VLIW instructions contain a number of operations to be executed simultaneously, because of instruction dependencies few applications have either sufficient instruction level parallelism (ILP) or the correct mix of instructions to issue every cycle. Therefore, some or all of the operations in a VLIW instruction have to be NOP's (i.e. No Operations). This has the undesirable effect of using up instruction bandwidth and increasing program size.

It is desirable to only fetch and issue instructions that are useful operations. If in a VLIW machine all the functional units were identical then the solution is relatively simple where only a single bit is needed to indicate an end-of-bundle marker. This so-called 'bundle' refers to the bundle of instructions contained in a fetched instruction packet. However, for most VLIW engines the functional units are independent and are specific units responsible for executing different operations specified within the instructions of the retrieved bundle. When the functional units are not the same, the solution is not so simple, because each instruction in the bundle needs to indicate to which functional unit it is destined, while still providing an indication of the end-of-bundle marker. This requires more bits which may not be available.

One possible solution could be to have a separate packet header or a so-called "bundle header", which indicates the number of instructions in the bundle and their arrangement. It therefore becomes possible to eliminate the NOP's, but the bundle header would need to be coded as a byte or half-word resulting in alignment issues for the VLIW instructions.

SUMMARY OF THE INVENTION

One aim of the present invention is to provide a method for executing fetched VLIW instructions such that some or all of the NOP operations to be executed can be eliminated.

According to one aspect of the present invention there is provided a method for executing instruction packets on a computer where each instruction packet comprises a plurality of instructions, said method comprising the following steps: fetching an instruction packet; identifying from option bits encoded in a first one of said plurality of instructions of said fetched instruction packet which, if any, of the remaining instructions within said packet are to be executed in the same execution cycle as the first instruction; and executing said first instruction and any said remaining instructions identified from the encoded option bits.

According to another aspect of the present invention there is provided a processor having a plurality of pipelines each capable of executing instruction packets where each instruction packet comprises a plurality of instructions and said pipeline comprises: an instruction fetch stage for fetching an instruction packet; circuitry for identifying from option bits encoded in a first one of said plurality of instructions of said fetched instruction packet which, if any, of the remaining instructions within said packet are to be executed in the same execution cycle as the first instruction; and an execution stage for executing said first instruction and any said remaining instructions identified from the encoded option bits.

According to yet a further aspect of the present invention there is provided a method of executing a computer program on a computer to process three dimensional graphics data, the program having instruction packets each comprising a plurality of instructions comprising at least a first floating point instruction, the method comprising determining from option bits encoded in said first instruction which, if any, of the remaining instructions within said instruction packet are to be executed in the same execution cycle as said first instruction.

BRIEF DESCRIPTION OF THE DRAWINGS

The present invention will now be described by way of an example with reference to the accompanying drawings, in which:

FIG. 5 shows a common operation performed on corresponding SIMD lanes;

FIG. 6 shows the instruction encoding formats supported by the functional units of the present invention;

FIG. 9 shows a processor executing instructions having five pipelines;

DETAILED DESCRIPTION

Figure 1:
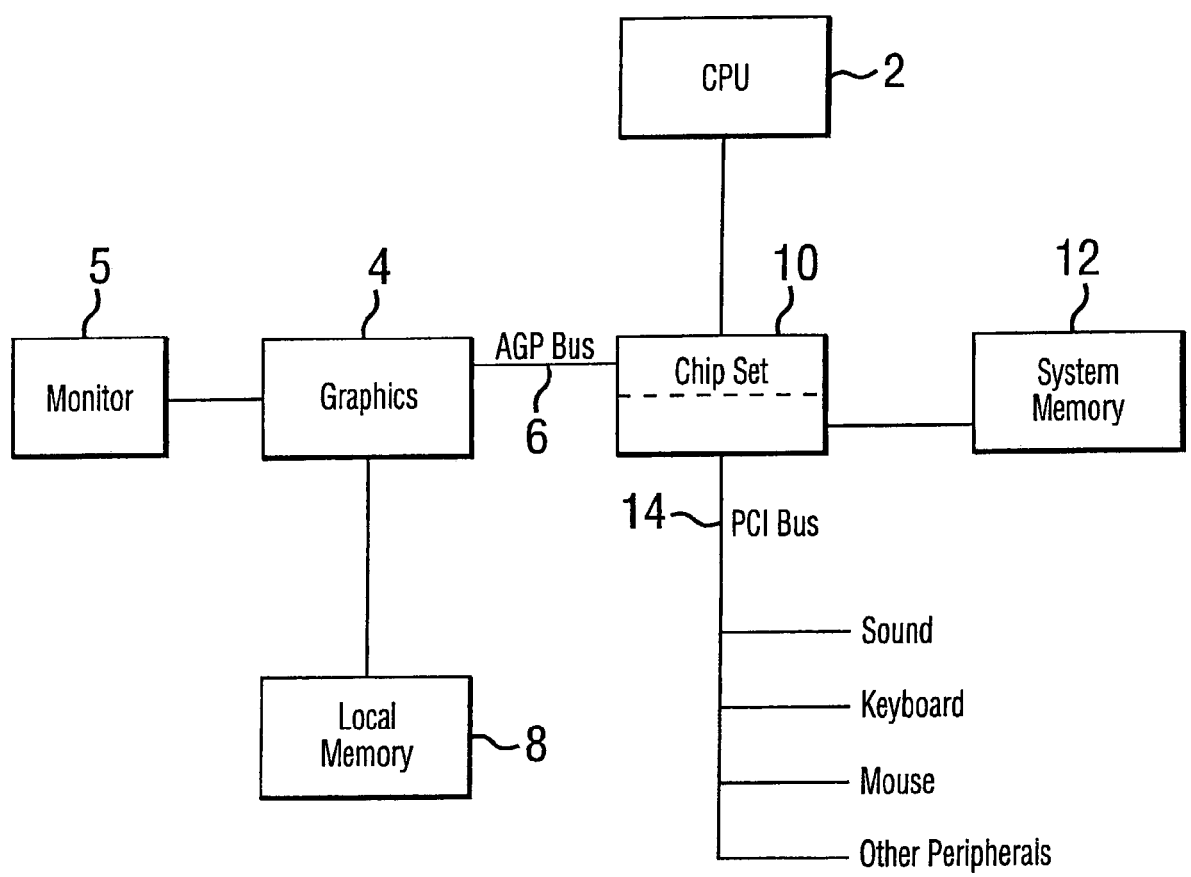
FIG. 1 shows an overview of a graphics chip.

FIG. 1 shows an overview of a graphics chip having a CPU (Central Processing Unit) 2 interfacing with a chip set 10 that represents the core functionality of a mother board. The chip set is shown as using a PCI bus 14 to connect to the various peripheral devices, for example keyboard, mouse, etc. The chip set 10 also connects to system memory 12 where program instructions may be stored. Finally, the chip set 10 interfaces with a graphics subsystem 4 using an AGP (Accelerated Graphics Port) bus 6. The graphics subsystem 4 is connected to a display monitor 5 and a local memory 8 that stores all the images needed for 3D operations.

Figure 2:
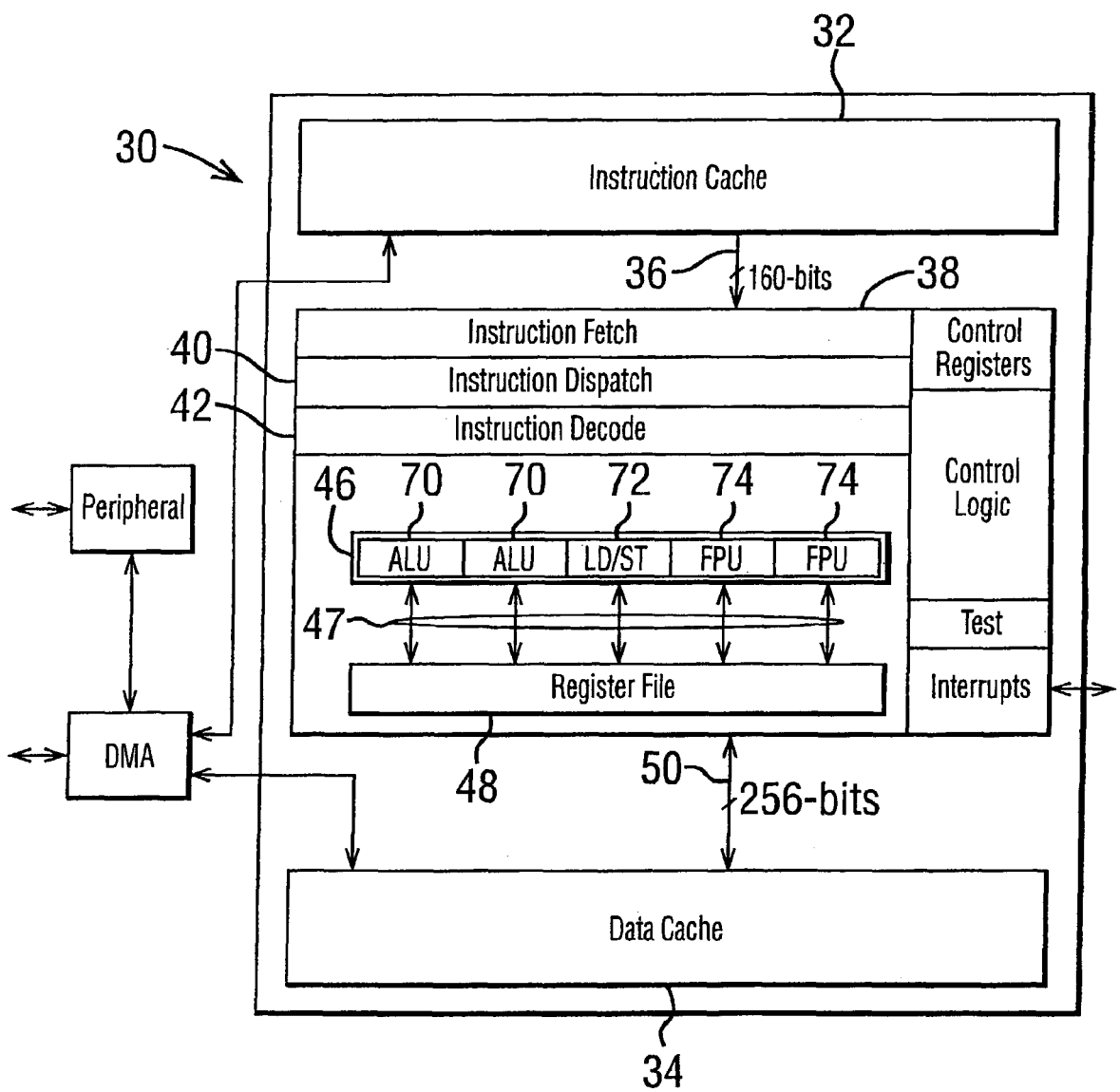
FIG. 2 shows a VLIW engine of an embodiment of the present invention.

The processor 2 of the present invention has a VLIW engine with a RISC architecture capable of SIMD (Single Instruction Multiple Data) vector processing. A VLIW core 30 of the present invention is shown in FIG. 2 as having five functional units 46: a Load/Store unit LD/ST 72, two integer multiply & floating point units FPU 74, and two arithmetic logic units ALU 70. Each VLIW engine 30 has a data cache 34 for load/store operations to/from 47 a general purpose register file 48, which in turn is able to connect to a data cache 34 using a 256-bit wide bi-directional data transfer path 50. Typically, the processor 2 of the present inventions would include multiple VLIW cores, each core being modular in design and having its own instruction cache 32 and data cache 34. The length of the VLIW instruction supported by each VLIW core 30 is 160 bits.

The processor architecture is simplified for efficiency and use in the following ways:

- All instructions are fully pipelined with different latency through the different functional units.
- Each functional unit issues instructions in-order and they complete in-order except for the LD/ST unit that can also complete out-of-order.
- The execution units do not generate exceptions, many of these may instead be generated in the software.
- There are no synchronisation issues amongst the functional units except that all instruction fetching and decoding occurs synchronously.
- Instructions are aligned and therefore there are no alignment issues when fetching instruction packets from memory.

FIG. 2 also serves to illustrate the basic pipeline arrangement for each VLIW instruction, which contains the following stages:

Fetch instruction 38—The VLIW engine contains an instruction cache 32 where during an instruction fetch 38, a fetched data packet is transferred along the 160-bit wide instruction path 36.

Dispatch instruction 40—Certain bits of the first instruction of the data packet are inspected for selecting which instructions in the packet can be dispatched as will be explained later.

Decode instruction 42—Each instruction is decoded which includes reading the relevant operands from the register file.

Execute instruction 46—The opcode specifies the type of operation to be performed and the relevant execution unit performs the specified operation on the data operands.

Write Back instruction 47—The result of the operation is then written back into the register file.

The execution units 46 use the bi-directional interface 47 to read and write operands from the register file 48.

Figure 3:
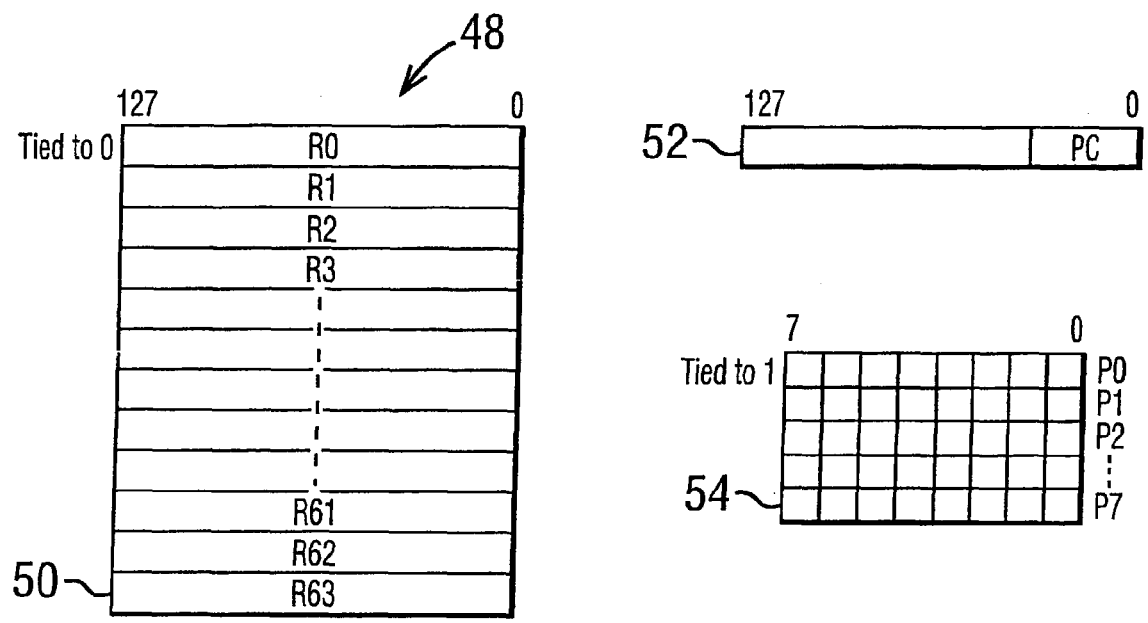
FIG. 3 shows an example of a register file for use with the present invention.

FIG. 3 shows the register file 48 containing sixty-four 128-bit general purpose registers 50, i.e. $R_0, R_1, \ldots, R_{63}$. These registers may be used for both integer and single-precision floating point execution. Register $R_0$ is tied to the value zero and any write operation to this register may be ignored. Any operation, apart from a CMP (Compare) or SEL (Select) operation, that specifies register $R_0$ will be a NOP (No operation). This alleviates the need for having an explicit NOP instruction opcode in the instruction set.

The register file 48 may contain special registers 52, for example the Program Counter (PC) that points to the address of the next instruction to be fetched. Also, eight predicate registers 54 are shown as P0, P1, . . . , P7 where these registers allow any instructions executed by the VLIW engine to be predicated. Predicated execution is a well-known technique whereby computer instructions are only carried out depending on whether a specified condition has been met. The predicate register P0 is tied to one and may be used to indicate that an instruction is always executed. The predicate registers 54 are only updated using a compare CMP instruction.

Figure 4A:
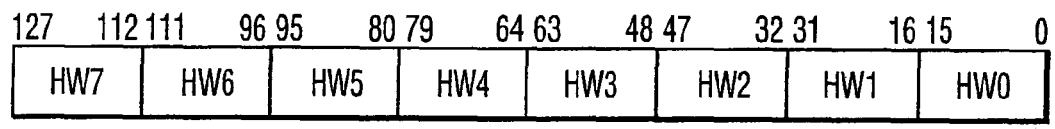
FIGS. 4a and 4b show a general-purpose register supporting eight 16-bit vectors and four 32-bit vectors respectively.
Figure 4B:
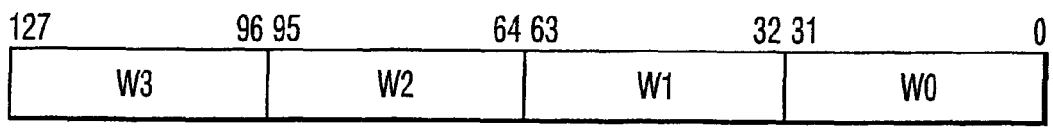

The general-purpose registers 50 can each hold 128-bit vectors that may be divided into operands of different lengths for SIMD processing. FIG. 4a shows a register being divided into eight 16-bit half-word values (HW0 . . . HW7), whereas FIG. 4b shows a register 50 being divided into four 32-bit word values (W0 . . . W3).

FIG. 5 assumes the case of FIG. 4b where each register is split into four 32-bit operands. Therefore, SIMD processing can be performed on the generic instruction of the form:

Operation $R_{src1}, R_{src2}, R_{dest}$ where for a specific operation (i.e. ADD), the four corresponding operands for each of the source registers $R_{src1}, R_{src2}$ will be added simultaneously and the four corresponding results will be written to the destination register $R_{dest}$.

The functional units 46 responsible for performing the different types of operations are described in more detail below.

The Load/Store Unit

There is a single LD/ST unit 72 that can read and write up to 256 bits (i.e. a register pair) and where a load or store instruction can be issued every cycle.

The Arithmetic Logic Units

The two ALU units 70 are each 128 bits wide and support SIMD vector processing operating on either four 32-bit vectors or eight 16-bit vectors. An example of the types of operations supported by these units include saturated arithmetic, logic operations (AND, OR, XOR, etc.), shift and rotate operations, count operations and permutations on the byte level. Permutations allow the position of data objects, including either byte data or half-word data stored within registers, to be interchanged or shuffled according to some pattern defined by the particular instruction. This unit also executes CMP and SEL instructions, responsible for updating the predication registers 54 and speculative execution. Furthermore, the ALU operations generate a 4-bit status flag for each SIMD lane comprising:

C: The carry flag is set if there was a carry-out or a "1" was the last bit to be shifted out.

V: The overflow flag is set by taking the XOR of the carry-out and the carry-in to the most significant bit.

N: The negative flag is set if the most significant bit is "1".

Z: The zero flag is set if all the bits in the SIMD lane are "0".

These flags are sticky for only one cycle and will be overwritten in the next cycle by another operation. So if status condition information is required, then in the next cycle and in the same ALU unit, a move instruction MVSC must be issued to move the flags into a general purpose register 50. Thereafter, compare instructions CMP can be carried out to set predication registers 54.

The Floating Point Units

The two FPU units 74 are each responsible for performing integer multiplication and floating point operations, each unit being capable of issuing four MAC instructions every cycle. The FPU units are mostly compatible with the IEEE 754 floating point standard.

FIG. 6 shows five possible instruction encoding formats 20, 22, 24, 26, 28 supported by the VLIW engine of the present invention. The FPU units 74 only support "Register-Register" operations, while the ALU units 70 support both "Register-Register" and "Register-Immediate" operations. Thus each unit can only accept certain types of instruction format.

More generally, the FPU units 74 can only accept the first type of instruction encoding format 20, while the ALU units 70 can accept both the first and second types of instruction encoding formats 20, 22. The LD/ST unit 72 can accept any of the third, fourth or fifth instruction encoding formats 24, 26, 28. The third type of instruction format 24 is used for LOAD or STORE operations. The fourth type of instruction format 26 is used for moving immediate values to registers and/or for branching using a register value. The fifth type of instruction format 28 is used for long 'branch' operations.

Figure 7:
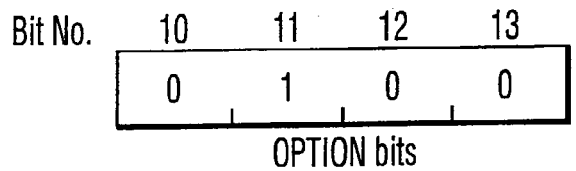
FIG. 7 shows an enlarged view of the OPTION bits.

FIG. 7 shows an enlarged view of the four so-called "option" bits set in the first type of instruction 20. The option bits are located at bit positions 10, 11, 12 and 13 of the first type of 32-bit instruction 20. Since the primary application of the present invention is 3D graphics, most of the processing is dominated by floating point and multiplication operations. Therefore, in most cycles one of the FPU units will execute a useful instruction and not a NOP. Each bit of the four option bits corresponds to instructions for the remaining four execution units and determines whether or not the corresponding instruction is to be issued in the fetched instruction packet.

The VLIW engine of FIG. 2 can issue five instructions every cycle. Therefore, every cycle a VLIW engine is able to fetch an instruction as shown in Table 1 below.

TABLE 1

| FPU1 | FPU2 | LD/ST | ALU1 | ALU2 |
| --- | --- | --- | --- | --- |

Therefore, using the four option bits 10-13 (FIG. 6) set in the first 32-bit instruction, one is then able to encode the following four instructions in the instruction packet. Table 1 in the described embodiment shows that the first instruction will be executed on one of the floating point units FPU1. The first instruction contains the four option bits for determining which of the four remaining instructions in the fetched instruction packet will be issued in that cycle. For example, consider the case when an instruction packet fetched from the instruction cache 32, has the option bits 10-13 of the first instruction set to 0100. A zero in the set of option bits means that the corresponding instruction in the fetched instruction packet will not be issued in that cycle. Therefore, 0100 indicates to the functional units that only the FPU 1 and LD/ST instructions are to be issued in that cycle. Similarly, the bit pattern 1001 indicates that the FPU1, FPU2 and ALU2 instructions will be issued in that cycle.

In summary, referring back to the various stages of execution shown by FIG. 2, an instruction packet containing five 32-bit instructions is fetched from an instruction cache 32 of the VLIW engine. The option bits of the first instruction in the fetched 160-bit instruction packet are examined indicating the instructions to be issued in that cycle, which are dispatched to the decoding stage. The fetched instruction packet is in fact a VLIW instruction to be executed by one of the VLIW engines.

Pipelined Execution

Figure 8:
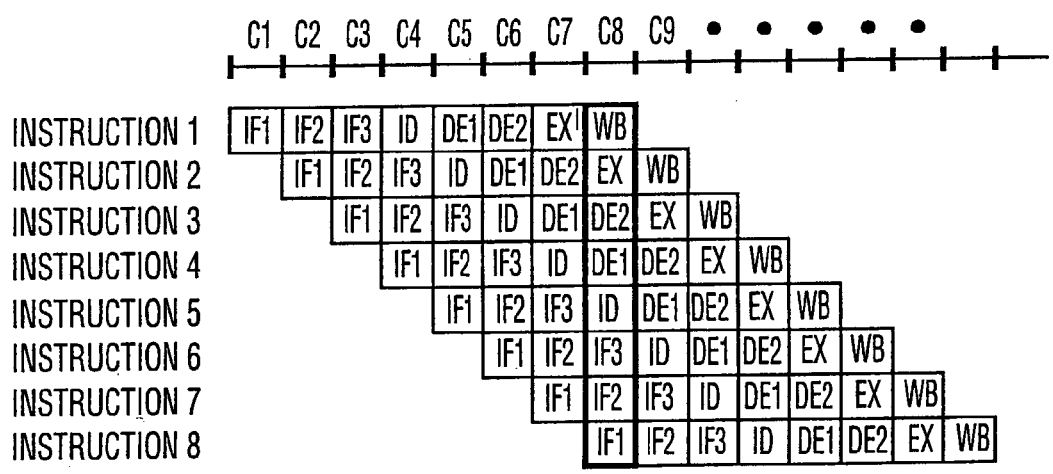
FIG. 8 shows a processor executing instructions using a pipeline.

There are at least eight stages that each instruction undergoes as indicated by the pipeline shown in FIG. 8. FIG. 8 is a simplified model used to demonstrate the functions performed by each stage of a single pipeline. More generally, for the purposes of FIG. 8 it is assumed that the fetched instruction packet from the instruction cache 32 only comprises one instruction. It should also be appreciated that the stages shown are typically the number of stages that an instruction will be subjected to, however some instructions do require multiple execute stages EX resulting in an overall increase in the number of pipeline stages for that instruction.

In other words, for pipelined operation an instruction for example INSTRUCTION 1 is processed in various stages allowing different stages of a number of instructions to be performed at the same time without impacting the critical path. Therefore, it is possible to obtain maximum processor use by allocating different processing functions to various instructions.

In the example of FIG. 8, for the first clock cycle C1 a first instruction fetch stage IF1 (described in more detail later) is performed on INSTRUCTION 1. In a second clock cycle C2, a second instruction fetch stage IF2 is performed on INSTRUCTION 1 and a first instruction fetch stage IF1 is performed on an INSTRUCTION 2. Therefore, it can be seen from the eigth clock cycle C8 onwards all the stages of the pipeline are being performed on various instructions, resulting in the maximum use of the processor being achieved. In more detail for the clock cycle C8, the following operations are performed simultaneously:

The write-back stage WB of INSTRUCTION 1,
The execute stage EX of INSTRUCTION 2,
The second decode stage DE2 of INSTRUCTION 3,
The first decode stage DE1 of INSTRUCTION 4,
The instruction dispatch stage ID of INSTRUCTION 5,
The third instruction fetch stage IF3 of INSTRUCTION 6,
The second instruction fetch stage IF2 of INSTRUCTION 7, and
The first instruction fetch stage IF1 of INSTRUCTION 8.

As mentioned earlier, FIG. 8 only shows a single pipeline. However, the VLIW engine of the present invention is capable of executing at least five instructions simultaneously and FIG. 9 shows pipelined processing involving VLIW instructions. So for each clock cycle, a single VLIW core of the present invention is able to complete 5*8=40 operations when operating at maximum throughput as indicated by the rectangle drawn in bold.

Figure 10:
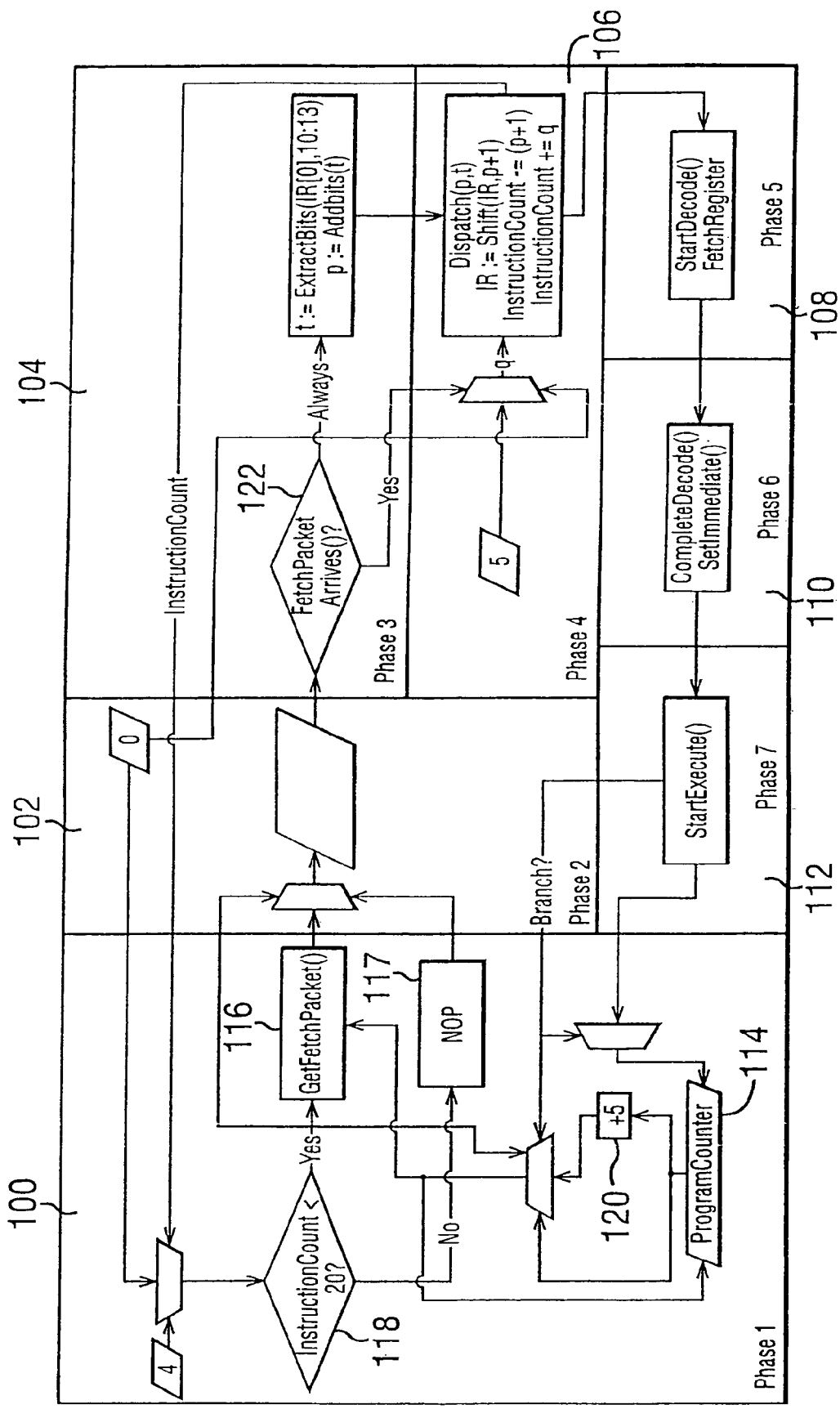
FIG. 10 shows a flow diagram within each stage of the pipeline of the described embodiment.

The pipeline will now be described in more detail. FIG. 10 shows a preferred embodiment of the first seven stages 100, 102, 104, 106, 108, 110, 112 of the pipeline. In the seventh phase 112 only a single execution stage is shown and a write-back phase is not shown.

Figure 11:
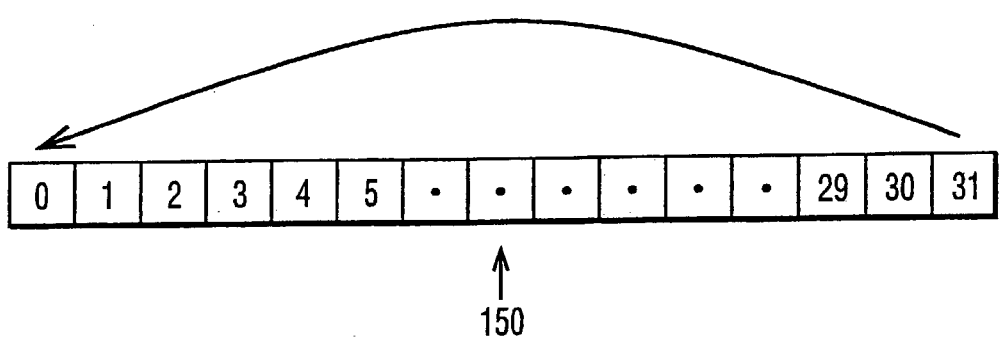
FIG. 11 shows a cyclic instruction buffer.

In the first phase 100, a "GetFetchPacket( )" routine 116 is used which requests a VLIW packet to be fetched from the instruction cache and eventually transfers the fetched instructions into an instruction buffer (see FIG. 11). An "Instruction-Count" variable keeps count of the number of outstanding instructions contained in the instruction buffer still to be issued. For the first four cycles, where five instructions are retrieved for each VLIW packet retrieved, the Instruction-Count will be less than or equal to 20.

After the first four cycles, the InstructionCount value is checked 118. If this value is less than 20, then a request for fetching a packet is made. Otherwise no instruction fetch request is made. A Program Counter 114 holds the instruction fetch address. If a fetch request was made, then it is incremented by 5.

In the second phase 102 the request for a VLIW packet is sent to the instruction cache and the fetched packet is then transferred into an instruction buffer which can hold up to 32 instructions.

In the third phase 104, the VLIW packet arrives 122 from the instruction cache into the instruction buffer. FIG. 11 shows a preferred embodiment of the cyclic buffer 150 that is able to store 32 instructions. A head pointer and a tail pointer are used to control the operation of the cyclic buffer. Initially, the head pointer points to the first empty slot of the instruction buffer, i.e. position 0. As packets are fetched, this head pointer will subsequently be incremented each time by a value of (p) modulo 32 where p represents the number of instruction issued in a cycle. More specifically, looking at the head pointer instruction word (i.e. position 0 for the first fetched packet), the option bits 10-13 are extracted. These extracted bits are then added and assigned to the variable p. The addition of these bits results in a value for p which identifies the number of instructions to be executed and the execution units to be used. The tail pointer is used to point to the start of where the next fetched packet is to be inserted. This will initially be at position 5, but will be subsequently incremented by 5 (modulo 32).

In the fourth stage 106, the instructions are dispatched with information about which units they need to be dispatched to. Also, the InstructionCount value is updated. In the event of a branch instruction, the head pointer is reset to position 0 and the tail pointer is set to position 5.

The fifth, sixth and seventh stages 108, 110, 112 correspond to first and second decode stages and an execute stage respectively.

Annex 1 is an example demonstrating the operation of the cyclic buffer for a plurality of cycles of pipelined execution. The table has five columns representing: the number of instructions fetched, the number of instructions dispatched, the fullness of the buffer (i.e. the value of InstructionCount) and the positions of the head and tail pointers. For the first three cycles the first stage of the pipeline runs the GetFetchPacket routine where in each cycle a request is made for a VLIW packet (i.e. five instructions) from the instruction cache.

More specifically, during cycle 1 a GetFetchPacket routine for fetching a first packet is initiated.

During cycle 2, in the first phase 100 another GetFetchPacket routine for fetching a second VLIW packet is initiated, while at the same time in the second phase 102 the request for the first packet is sent to the instruction cache.

During cycle 3, in the first phase 100 a fetching routine for a third packet is initiated. In the second phase 102, a request for the second packet is sent to the instruction cache. In the third phase 104 a check is performed to see whether the first packet has arrived in the instruction buffer. The options bits are extracted from bits 10-13 of the first instructions and then added.

During cycle 4, in the first stage 100 a further routine for fetching a packet is initiated. In the second stage 102 a request for the third packet is sent to the instruction cache. In the third stage 104 a check is performed to see whether the second packet has arrived in the instruction buffer where the options bits are extracted and added. In the fourth stage 106, the instructions to be issued are dispatched and the instruction buffer is manipulated accordingly. In the example for cycle 4 it can be seen that the encoded option bits only identify one instruction to be issued. The count of the number of outstanding instructions still remaining in the buffer is updated so that InstructionCount now has the value 4 (i.e. 5 instructions less the 1 instruction that was issued). Also, the head pointer which was initialised to the first position of the instruction buffer is now incremented by 1 (modulo 32) showing the next instruction to be executed. The tail pointer is initialised to point to the position 5 as the position in the instruction buffer where the next fetched packet is to be inserted.

During cycle 5, the first three phases are as before but instead dealing with the next fetched packet. In the fourth stage 106 again only one instruction has been dispatched and therefore there are still eight instructions outstanding in the buffer (4 instructions from previous cycle plus 5 from the present cycle minus 1 instruction issued in the present cycle). The head pointer is again moved on by 1 (module 32) and now points to position 2 of the instruction buffer. Also, the tail pointer is incremented by the standard increment of 5 (module 32) and now points to position 10 of the instruction buffer. In the fifth stage 108, the first part of the decode routine for the first issued instruction is initiated, i.e. StartDecode( ).

During cycle 6. the first three phases are as before but instead dealing with the next fetched packet. In the fourth stage 106 the option bits identify two instructions to be issued. This means that the buffer will be updated to reflect that 11 instructions are still outstanding where the head and tail pointers are updated to point to instruction positions 4 and 15 respectively. In the fifth stage 108, the first part of the decode routine for the second issued instruction is initiated, i.e. StartDecode( ). In the sixth stage 110, the CompleteDecode routine for the first issued instruction is performed.

During cycle 7, the first three phases are as before but instead dealing with the next fetched packet. In the fourth stage 106 this time the option bits identify only one instruction to be issued. In the fifth stage 108, the first part of the decode routine for the third and fourth issued instructions is initiated, i.e. StartDecode( ). In the sixth stage 110, the CompleteDecode routine for the second issued instruction is performed. In the seventh stage 112, the first issued instruction is executed.

During cycle 8, the first three phases are as before but instead dealing with the next fetched packet. In the fourth stage 106 this time the option bits identify four instruction to be issued. In the fifth stage 108, the first part of the decode routine for the fifth issued instructions is initiated, i.e. StartDecode( ). In the sixth stage 110, the CompleteDecode routine for the third and fourth issued instructions is performed. In the seventh stage 112, the second issued instruction is executed.

It should be noted that because of the cyclical nature of the instruction buffer, the tail pointer continues to be automatically incremented by a value of 5 (module 32) so that after cycle 8 the tail pointer points to position 30 and then wraps around to point to position 3 for cycle 9.

Furthermore it should be noted that during cycle 13, in the first phase 100, it is established that the InstructionCount variable is not less than 20 (i.e. the value is 21). In this case, a fetch packet routine is not initiated and it can be seen that five new instructions are not transferred from the instruction cache into the instruction buffer. This continues for several cycles until cycle 20 where the number of instructions in the buffer (i.e. instructionCount) is 15, resulting in the fetch packet routine once again being initiated.

It should be appreciated that all the instruction types, i.e. the load/store instruction, the floating point and the arithmetic instructions have the same fetch, dispatch and decode stages, but have different numbers of execution stages. For Example, for an integer ALU operation there is only a single execution stage, but for other types of operations there may be multiple execution stages for a given instruction.

The reason for performing the InstructionCount check is that there is preferably a plurality of instructions in the instruction buffer (each instruction corresponding to a particular execution unit), so that there is no latency through the pipeline as a result of a lack of instructions to be found in the instruction buffer.

In summary, during the pre-decode stage 106 the four option bits are extracted from bits 10-13 of the first instruction in the instruction packet. These bits are then added together to give a value that is indicative of which of the other four instructions in the instruction packet are to be issued. Therefore, already at the pre-decode stage the pipeline is able to ascertain which of the execution units need to be invoked. So, if the option bits for the FPU1 and FPU2 instructions are not to be issued, then these floating point units may be placed in a power-save mode to increase the processor's power consumption efficiency.

During the dispatch stage 108 the relevant instructions to be issued are dispatched to the decode unit. Also, at this stage the processor is aware of the number of instructions that have been issued and is therefore able to feedback a signal indicating the number of outstanding instructions remaining in the storage buffer. This signal updates the instruction counter so that during the first instruction stage of the next iteration, the processor is aware of the number of instructions remaining in the storage buffer and is able to perform the comparison all over again.

The compiler is able to point to those outstanding instructions that may be issued once their relevant dependencies have been resolved and sets the relevant option bits accordingly.

Figure 12:
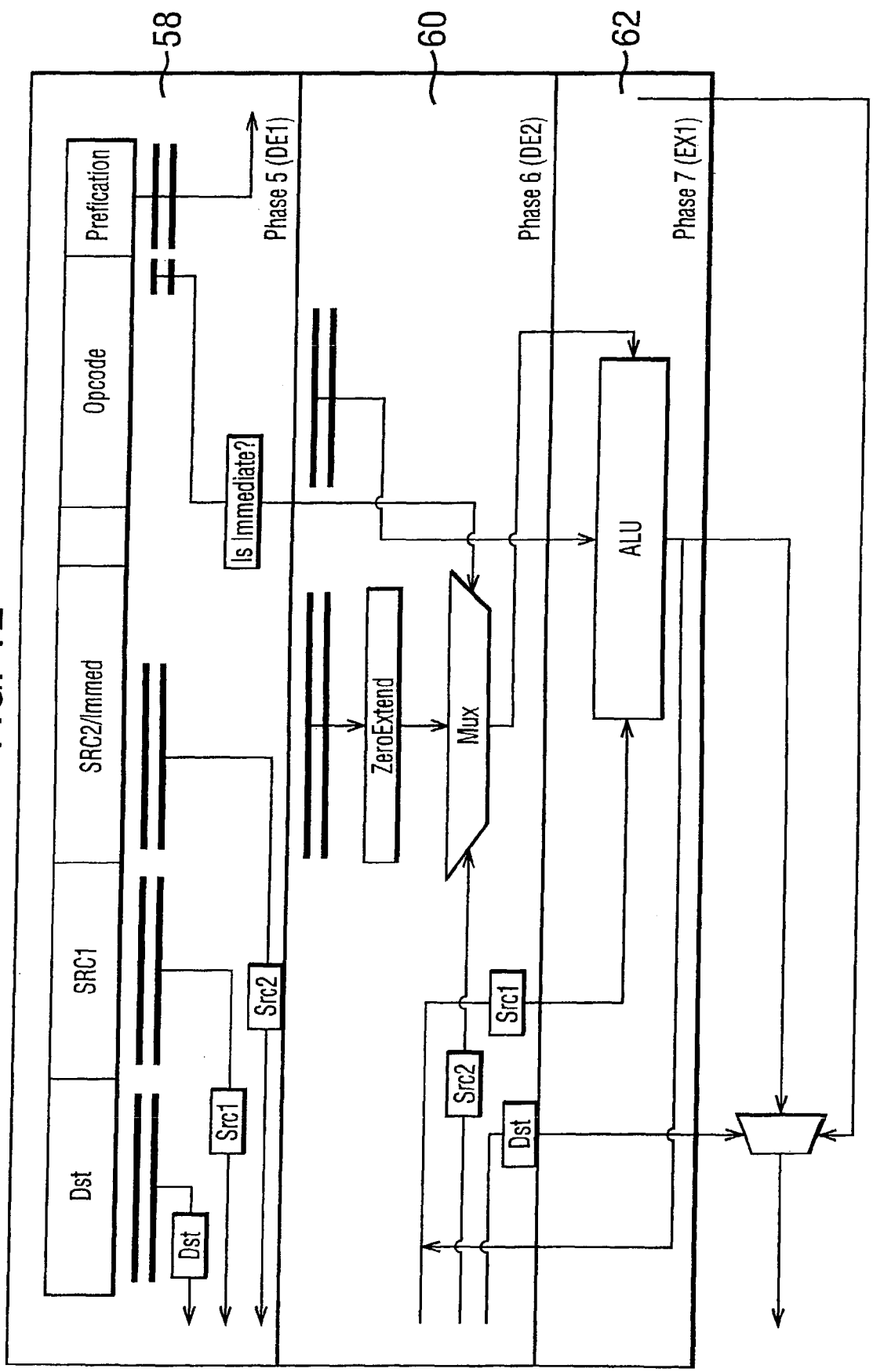
FIG. 12 shows a more detailed view of the decode and execute stages of the pipeline.

FIG. 12 provides more detail of the decode stages 108, 110 and the execute stage 112. The first decode stage 108 is the so-called "StartDecode" stage where the instruction is decoded into a recognisable format for the processor. This may include an inspection of the:

predication bits of the instruction to determine if the instruction is ready to be issued, or of the first few bits of the OPCODE to determine whether the instruction is operating on an immediate (i.e. constant) value or not.

The second decode stage 110 is the so-called "CompleteDecode" stage where a multiplexer decides whether the SRC2/IMMED field of the instruction refers to a register address for the SRC2 operand or whether this field simply contains an immediate value.

In the execute stage 112, an ALU performs a logical operation (as given by the OPCODE field) on the operand given by the SRC1 instruction field and/or the operand given by the SRC2/IMMED instruction field. The result is placed in a destination register as given by the DST instruction field. Although, only one execute stage is shown in the pipelines of FIGS. 8 and 9, there can be a plurality of execution stages if the instructions require this.

It should be appreciated that multiple VLIW engines can exist on each graphic chip. Therefore, in a typical 3D graphics application, the functional blocks responsible for performing lighting model data transformations may include a plurality of VLIW cores making the chip scalable. The VLIW cores may be modular in design thereby allowing each core to have their own instruction cache, data cache and register file as shown by FIG. 3. However, this functional list is non-exhaustive and in fact the functionality for example offered by the same register file may be used by both the integer and floating-point units to minimise load operations. It should also be appreciated that more functional units may be added to the five units described herein depending on user requirements. Moreover, the order of these units may be interchanged so that although in the description, unit 1 was a floating point unit FPU1, in alternative configurations unit 1 may be an arithmetic unit. Also, in other implementations it would be possible to set option bits in locations other than at bit position 10-13 of the first instruction in the fetched instruction packet.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

ANNEX: 1

| CYCLE No. | Number Fetched | Number Dispatched | Buffer Full | Head | Tail |
|---|---|---|---|---|---|
| 1 | 5 | 0 | 0 | 0 | |
| 2 | 5 | 0 | 0 | 0 | |
| 3 | 5 | 0 | 0 | 0 | |
| 4 | 5 | 1 | 4 | 1 | 5 |
| 5 | 5 | 1 | 8 | 2 | 10 |
| 6 | 5 | 2 | 11 | 4 | 15 |
| 7 | 5 | 1 | 15 | 5 | 20 |
| 8 | 5 | 4 | 16 | 9 | 25 |
| 9 | 5 | 3 | 18 | 12 | 30 |
| 10 | 5 | 4 | 19 | 16 | 3 |
| 11 | 5 | 5 | 19 | 21 | 8 |
| 12 | 5 | 3 | 21 | 28 | 13 |
| 13 | 0 | 2 | 24 | 30 | 18 |
| 14 | 0 | 1 | 28 | 31 | 23 |
| 15 | 0 | 1 | 32 | 0 | 28 |
| 16 | 0 | 3 | 29 | 3 | 28 |
| 17 | 0 | 2 | 27 | 5 | 28 |
| 18 | 0 | 4 | 23 | 9 | 28 |
| 19 | 0 | 3 | 20 | 12 | 28 |
| 20 | 0 | 5 | 15 | 17 | 28 |
| 21 | 5 | 5 | 10 | 22 | 28 |
| 22 | 5 | 3 | 7 | 25 | 28 |
| 23 | 5 | 3 | 4 | 28 | 28 |
| 24 | 5 | 4 | 5 | 0 | 1 |

What is claimed is:

1. A method for executing instruction packets on a computer comprising a pipelined processor where each instruction packet comprises a plurality of instructions, each of which is capable of being executed by an execution stage of the pipelined processor, and each of which is in one of a plurality of instruction formats, said method comprising the following steps:

fetching a first of the instruction packets during an instruction fetch, wherein the first instruction packet includes each of a plurality of instructions fetched during the instruction fetch, wherein the plurality of instructions includes a first instruction that is in a first of the plurality of instruction formats, wherein the first instruction format comprises a plurality of option bits that indicate which, if any, of the remaining instructions in the first instruction packet are to be executed in the same execution cycle as the first instruction, and wherein the first instruction is the only instruction in the first instruction packet that is in the first instruction format;

identifying from the option bits encoded in the first instruction of said plurality of instructions of said first instruction packet which, if any, of the remaining instructions within the first instruction packet are to be executed in the same execution cycle as the first instruction, wherein the option bits comprise at least one bit that corresponds to each of the instructions in the first instruction packet except for the first instruction, and wherein each option bit indicates whether its corresponding instruction is to be executed in the same execution cycle as the first instruction without reference to any of the other option bits; and executing said first instruction and any of said remaining instructions identified from the encoded option bits.

2. A method according to claim 1, wherein said first instruction is a floating point instruction.

3. A method according to claim 1, wherein the first instruction packet comprises five instructions and said identifying step is done using four option bits, each bit corresponding to each of the remaining instructions within said fetched instruction packet.

4. A method according to claim 3, wherein each instruction within said instruction packet is a 32-bit instruction having bit position 0 as the least significant bit.

5. A method according to claim 4, wherein the option bits are located at bit positions 10-13 of said first instruction in the fetched instruction packet.

6. A processor having a plurality of pipelines each capable of executing instruction packets where each instruction packet comprises a plurality of instructions, wherein each of the plurality of instructions is in one of a plurality of instruction formats and said pipeline comprises:

an instruction fetch stage for fetching a first of the instruction packets during an instruction fetch, wherein the first instruction packet includes each of a plurality of instructions fetched during the instruction fetch, wherein the plurality of instructions includes a first instruction that is in a first of the plurality of instruction formats, wherein the first instruction format comprises a plurality of option bits that indicate which, if any, of the remaining instructions in the instruction packet are to be executed in the same execution cycle as the first instruction, and wherein the first instruction is the only instruction in the instruction packet that is in the first instruction format;

circuitry for identifying from the option bits encoded in the first instruction of said plurality of instructions of said first instruction packet which, if any, of the remaining instructions within said first instruction packet are to be executed in the same execution cycle as the first instruction, wherein the option bits comprise at least one bit that corresponds to each of the instructions in the first instruction packet except for the first instruction, and wherein each option bit indicates whether its corresponding instruction is to be executed in the same execution cycle as the first instruction without reference to any of the other option bits; and an execution stage for executing said first instruction and any of said remaining instructions identified from the encoded option bits.

7. A processor according to claim 6, wherein each pipeline comprises an instruction cache for storing each instruction packet during said instruction fetch stage where each instruction packet comprises at least five instructions.

8. A processor according to claim 6, wherein each pipeline comprises a register file for storing operands.

9. A processor according to claim 8, wherein each pipeline comprises a plurality of functional units for performing operations, specified by each of said instructions, on said operands during said execution stage.

10. A processor according to claim 9, wherein each pipeline comprises a dispatch unit for determining from the option bits which of said remaining instructions in said first instruction packet to issue for execution.

11. A processor according to claim 10, wherein each pipeline comprises a decode unit for decoding each of said instructions to be executed.

12. A method of executing a computer program on a computer to process three dimensional graphics data, the computer comprising a pipelined processor, the program having a plurality of instruction packets each comprising a plurality of instructions, each of which is capable of being executed by an execution stage of the pipelined processor, and each of which is in one of a plurality of instruction formats, wherein wherein the plurality of instruction packets comprises a first instruction packet fetched during an instruction fetch and including each of a first plurality of instructions fetched during the instruction fetch, the first plurality of instructions comprising at least a first floating point instruction that is in a first of the plurality of instruction formats, wherein the first instruction format comprises a plurality of option bits that indicate which, if any, of the remaining instructions in the first instruction packet are to be executed in the same execution cycle as the first floating point instruction, and wherein the first floating point instruction is the only instruction in the first instruction packet that is in the first instruction format, the method comprising determining from the option bits encoded in said first floating point instruction which, if any, of the remaining instructions within the first instruction packet are to be executed in the same execution cycle as said first floating point instruction, wherein the option bits comprise at least one bit that corresponds to each of the instructions in the first instruction packet except for the first floating point instruction, and wherein each option bit indicates whether its corresponding instruction is to be executed in the same execution cycle as the first floating point instruction without reference to any of the other option bits, and executing said first floating point instruction.

13. A method for executing instruction packets on a computer having a pipelined processor, where each instruction packet comprises a plurality of instructions, each of which is capable of being executed by an execution stage of the pipelined processor, and each of which is in one of a plurality of instruction formats, said method comprising the following steps:

fetching a first of the instruction packets during an instruction fetch, wherein the first instruction packet includes each of a first plurality of instructions fetched during the instruction fetch, wherein the first plurality of instructions includes a first instruction that is in a first of the plurality of instruction formats, wherein the first instruction format comprises a plurality of option bits that indicate which, if any, of the remaining instructions in the first instruction packet are to be executed in the same execution cycle as the first instruction, and wherein the first instruction is the only instruction in the instruction packet that is in the first instruction format;

identifying from the option bits encoded in the first instruction which, if any, of the remaining instructions within the first instruction packet are to be executed in the same execution cycle as the first instruction, wherein the option bits comprise at least one bit that corresponds to each of the plurality of instructions in the fetched instruction packet except for the first instruction, and wherein each option bit indicates whether its corresponding instruction is to be executed in the same execution cycle as the first instruction without reference to any of the other option bits;

executing said first instruction and any of said remaining instructions identified from the encoded option bits; and holding in a buffer any of the first plurality of instructions in the instruction packet not executed in said same execution cycle for later execution.

14. A processor having a plurality of pipelines, each capable of executing instruction packets, where each instruction packet comprises a plurality of instructions, wherein each of the plurality of instructions is in one of a plurality of instruction formats and said pipeline comprises:

an instruction fetch stage for fetching a first of the instruction packets, wherein the first instruction packet includes each of a first plurality of instructions fetched during an instruction fetch, wherein the plurality of instructions includes a first instruction that is in a first of the plurality of instruction formats, wherein the first instruction format comprises a plurality of option bits that indicate which, if any, of the remaining instructions in the instruction packet are to be executed in the same execution cycle as the first instruction, and wherein the first instruction is the only instruction in the first instruction packet that is in the first instruction format;

circuitry for identifying from the option bits encoded in the first instruction which, if any, of the remaining instructions within said first instruction packet are to be executed in the same execution cycle as the first instruction, wherein the option bits comprise at least one bit that corresponds to each of the first plurality of instructions in the first instruction packet except for the first instruction, and wherein each option bit indicates whether its corresponding instruction is to be executed in the same execution cycle as the first instruction without reference to any of the other option bits;

an execution stage for executing said first instruction and any of said remaining instructions identified from the encoded option bits; and a buffer for holding any of the instructions in the first instruction packet not executed in said same execution cycle for later execution.

15. A method for executing instruction packets on a computer having a pipelined processor, where each instruction packet comprises a plurality of instructions, each of which is capable of being executed by an execution stage of the pipelined processor, and each of which is in one of a plurality of instruction formats, said method comprising the following steps:

fetching a first instruction packet in a first cycle, wherein the first instruction packet includes each of a first plurality of instructions fetched during the first cycle, wherein the first plurality of instructions includes a first instruction that is in a first of the plurality of instruction formats, wherein the first instruction format comprises a plurality of option bits that indicate which, if any, of the remaining instructions in the first instruction packet are to be executed in the same execution cycle as the first instruction, and wherein the first instruction is the only instruction in the first instruction packet that is in the first instruction format;

identifying from the option bits encoded in the first instruction which, if any, of the remaining instructions within the first packet are to be executed in the same execution cycle as the first instruction, wherein the option bits comprise at least one bit that corresponds to each of the instructions in the first instruction packet except for the first instruction, and wherein each option bit indicates whether its corresponding instruction is to be executed in the same execution cycle as the first instruction without reference to any of the other option bits;

executing said first instruction and any of said remaining instructions identified from the encoded option bits; and fetching a second instruction packet in a second cycle, said second cycle being the next cycle after said first cycle.

16. A processor having a plurality of pipelines, each capable of executing instruction packets, where each instruction packet comprises a plurality of instructions, wherein each of the plurality of instructions is in one of a plurality of instruction formats, and said pipeline comprises;

an instruction fetch stage for fetching a first of the instruction packets, said instruction fetch stage being arranged to fetch the first instruction packet in a first cycle and a second instruction packet in the next cycle after said first cycle, wherein the first instruction packet includes each of a first plurality of instructions fetched during the first cycle, wherein the first plurality of instructions includes a first instruction that is in a first of the plurality of instruction formats, wherein the first instruction format comprises a plurality of option bits that indicate which, if any, of the remaining instructions in the first instruction packet are to be executed in the same execution cycle as the first instruction, and wherein the first instruction is the only instruction in the first instruction packet that is in the first instruction format;

circuitry for identifying from the option bits encoded in the first instruction which, if any, of the remaining instructions within the first instruction packet are to be executed in the same execution cycle as the first instruction, wherein the option bits comprise at least one bit that corresponds to each of the instructions in the fetched instruction packet except for the first instruction, and wherein each option bit indicates whether its corresponding instruction is to be executed in the same execution cycle as the first instruction without reference to any of the other option bits; and an execution stage for executing said first instruction and any associated remaining instructions identified from the encoded option bits.

* * * * *

UNITED STATES PATENT AND TRADEMARK OFFICE
CERTIFICATE OF CORRECTION

| | |
|---|---|
| PATENT NO. | : 7,861,061 B2 |
| APPLICATION NO. | : 10/444932 |
| DATED | : December 28, 2010 |
| INVENTOR(S) | : Zahid Hussain |

It is certified that error appears in the above-identified patent and that said Letters Patent is hereby corrected as shown below:

On the Title Page,
Item (73) should read:
(73) Assignee: STMicroelectronics (R&D) Ltd., Buckinghamshire, (GB)

Signed and Sealed this
Eighth Day of February, 2011

David J. Kappos
*Director of the United States Patent and Trademark Office*